(12) United States Patent
Shimazoe et al.

(10) Patent No.: US 11,389,901 B2
(45) Date of Patent: Jul. 19, 2022

(54) LASER WELDING METHOD AND LASER WELDING JIG DEVICE

(71) Applicant: NOK CORPORATION, Tokyo (JP)

(72) Inventors: Toshihiro Shimazoe, Fujisawa (JP); Kento Nagamatsu, Fujisawa (JP); Hiroyuki Higashi, Fujisawa (JP)

(73) Assignee: NOK CORPORATION

( * ) Notice: Subject to any disclaimer, the term of this patent is extended or adjusted under 35 U.S.C. 154(b) by 382 days.

(21) Appl. No.: 16/629,383

(22) PCT Filed: Jul. 12, 2018

(86) PCT No.: PCT/JP2018/026271
§ 371 (c)(1),
(2) Date: Jan. 8, 2020

(87) PCT Pub. No.: WO2019/017265
PCT Pub. Date: Jan. 24, 2019

(65) Prior Publication Data
US 2020/0139486 A1    May 7, 2020

(30) Foreign Application Priority Data

Jul. 19, 2017 (JP) .............................. JP2017-140172

(51) Int. Cl.
*B23K 26/244* (2014.01)
*B23K 26/10* (2006.01)
*B23K 26/04* (2014.01)

(52) U.S. Cl.
CPC ............ *B23K 26/244* (2015.10); *B23K 26/10* (2013.01); *B23K 26/04* (2013.01)

(58) Field of Classification Search
CPC ...... B23K 26/04; B23K 26/10; B23K 26/103; B23K 26/21; B23K 26/244;
(Continued)

(56) References Cited

U.S. PATENT DOCUMENTS 6,355,906 B1 *   3/2002   Okuno ............... B23K 37/0443
                                              219/121.64
8,499,452 B2 *   8/2013   Hallmann ............. B23K 26/28
                                              29/890.039
(Continued)

FOREIGN PATENT DOCUMENTS

CN         101039772 A       9/2007
CN         104339085 A       2/2015
(Continued)

OTHER PUBLICATIONS

English Language Translation of Cited JP2014194876 (Year: 2014).*
(Continued)

*Primary Examiner* — Dana Ross
*Assistant Examiner* — Joseph W Iskra
(74) *Attorney, Agent, or Firm* — Harness, Dickey & Pierce, P.L.C.

(57) ABSTRACT

A pair of separators is overlapped and placed on a base jig and thereby positioned with each other. Respective through-holes thereof are positioned to the position of a pin hole provided in the base jig. When a main jig is pressed against the base jig to clamp the pair of separators, and a pin of a sub-jig is inserted into the pin hole to clamp the pair of separators by a head, an annular light guiding path is formed by a gap generated between an opening provided in the main jig and the head of the sub-jig, and hence a laser welding position which surrounds the through-holes is exposed. The surrounding of each through-hole is seamlessly laser-welded when the laser welding position is irradiated with a laser beam.

4 Claims, 8 Drawing Sheets

(58) Field of Classification Search
CPC ........... B23K 37/0443; B23K 37/0531; H01M 8/0202; Y02E 60/50
USPC ................................................... 219/121.64
See application file for complete search history.

(56) References Cited

U.S. PATENT DOCUMENTS

2008/0013277 A1  1/2008  Ueda et al.
2011/0005076 A1  1/2011  Hallmann

FOREIGN PATENT DOCUMENTS

| CN | 106624361 A | 5/2017 |
|---|---|---|
| DE | 10-2007-056717 B3 | 2/2009 |
| EP | 0694352 A1 | 1/1996 |
| JP | H04-000068 A | 1/1992 |
| JP | 2010-129289 A | 6/2010 |
| JP | 2011-161450 A | 8/2011 |
| JP | 2014-194876 A | 10/2014 |
| JP | 2014-229515 A | 12/2014 |
| KR | 2012-0048443 A | 5/2012 |

OTHER PUBLICATIONS

English Language Translation of Cited JP2010129289 (Year: 2010).*
Extended European Search Report for corresponding Application No. EP 18834803.1 dated Jun. 1, 2021 (5 pages).

* cited by examiner

LASER WELDING METHOD AND LASER WELDING JIG DEVICE

CROSS REFERENCE TO RELATED APPLICATIONS

This application is a U.S. National Phase application of International Application No. PCT/JP2018/026271, filed on Jul. 12, 2018 and published in Japanese as WO2019/017265A1 on Jan. 24, 2019 and claims priority to Japanese Patent Application No. 2017-140172, filed on Jul. 19, 2017. The entire disclosures of the above applications are expressly incorporated by reference herein.

BACKGROUND

Technical Field

The disclosure relates to a method for laser welding and a laser welding jig device for joining a pair of workpieces, for example, a pair of separators used for a fuel battery cell by laser welding.

Related Art

A fuel cell includes a reaction electrode portion (MEA) provided with a pair of electrode layers on both surfaces of an electrolyte membrane. In the reaction electrode portion, a separator is laminated on both sides in its thickness direction to constitute a fuel battery cell. A fuel cell having a stack structure in which a plurality of fuel battery cells are laminated supplies oxidation gas (air) to the cathode side of the reaction electrode portion, supplies fuel gas (hydrogen) to the anode side, and generates power by an electrochemical reaction which is a reverse reaction of the electrolysis of water.

A flow path for a medium such as oxidation gas (air), fuel gas (hydrogen), cooling water is provided in the stacked fuel battery cells. The flow path is formed by, for example, a separator. The separator is a structure in which a pair of plate members made of a metal material such as iron or aluminum are joined to each other. A flow path for the medium is formed between the pair of these members and between the members and another member.

FIG. 7 is a plan view showing a separator 1 described in Japanese Patent Application Laid-Open No. 2014-194876. The separator 1 is joined to a fuel electrode frame 2 (see FIG. 8) and has a plurality of through-holes 3 for passing a medium and an opening portion 4 for positioning a reaction electrode portion ("solid electrolyte layer 81" of JP 2014-194876). In FIG. 7, there are shown around the through-holes 3, laser welding marks 5 generated when it is joined to the fuel electrode frame 2. The through-holes 3 are laser-welded therearound all over the periphery thereof, whereby a part communicating with the through-hole 3 and a part not communicating with the through-hole 3 are closed. The laser welding mark 5 having closed the space in this manner is called a "closed circuit shape" in JP 2014-194876 (refer to paragraphs [0028] to [0036] of JP 2014-194876).

JP 2014-194876 discloses a welding jig device 11 such as shown in FIG. 8 as a device for manufacturing the above separator 1. The welding jig device 11 placed on an X-Y table 21 clamps the separator 1 and the fuel electrode frame 2 between a fixing jig member 12 and two jig members (a first jig member 13 and a second jig member 14) by clamp structures 15 and joins them by laser welding (refer to paragraphs [0042] to [0049] of JP 2014-194876).

More specifically, as shown in FIGS. 8 and 9, the separator 1 and the fuel electrode frame 2 are clamped between the fixing jig member 12 and the first jig member 13. A laser beam LB is irradiated from a laser irradiating device 31, and only the half of the periphery of the through-hole 3 is laser-welded by the laser beam LB guided through a first opening portion 13a. Subsequently, the first jig member 13 is replaced with the second jig member 14, and the remaining half of the periphery of the through-hole 3 is laser-welded by the laser beam LB guided through a second opening portion 14a (refer to paragraphs [0040] to [0052] of JP 2014-194876).

By performing a laser welding step in two parts, a laser welding mark 5 such as shown in FIG. 10 is formed (refer to paragraph [0053] of JP 2014-194876). The laser welding mark 5 is constituted of two split laser welding marks 5a, 5b, and the intersection of the two laser welding marks is to be an overlap region R in which they overlap each other. Thus, the closed circuit shape is maintained.

In order to make the periphery of the through-hole provided in the separator into the closed circuit shape, that is, the shape in which the whole circumference thereof is closed, in JP 2014-194876, the laser welding step is performed in two parts, and the first jig member 13 and the second jig member 14 are replaced with each other. There is room for improvement in that the number of steps increases.

There has been disclosed in Japanese Patent Application Laid-Open No. 2011-161450, a disclosure in which a pair of workpieces to be joined to each other is clamped by a first jig member (92) and a second jig member (96), a third jig member (98) is disposed in an opening portion (94) provided in the second jig member (96), and laser irradiation is performed on the workpieces through a gap (110) between the opening portion (94) and the third jig member (98). Therefore, the welding with no joint going around an outer peripheral portion of the workpiece (referred to as "seamless welding" in JP 2011-161450) can be performed by only one laser welding step (refer to paragraphs [0015], [0055], [0061], and [0062] of JP 2011-161450).

However, the method for laser welding described in JP 2011-161450 is a method of seamlessly performing welding along the outer periphery of the workpiece, but is not the method for laser-welding the periphery of the through-hole provided in the separator as described in JP 2014-194876, for example. The method for laser welding described in JP 2011-161450 cannot be applied simply to laser welding around the through-hole.

In the method for laser welding described in JP 2011-161450, the positioning of the third jig member (98) becomes important in terms of forming the gap (110) for exposing a laser welding region between the opening portion (94) and the third jig member (98). In JP 2011-161450, a positioning ring member (124) along an inner peripheral surface of the opening portion is temporarily set, and the third jig member positioned by the positioning ring member is fastened with a fastening member (116) (refer to paragraphs [0044] and [0046] of JP 2011-161450). Therefore, the number of steps for positioning the third jig member is increased, and further, complicated work is required. There is room for improvement.

It is an object of the disclosure to enable laser welding of the periphery of a through-hole provided in a workpiece seamlessly with a small number of steps. It is another object of the disclosure to enable laser welding of the periphery of a through-hole provided in a workpiece seamlessly without requiring complicated work.

SUMMARY

A method for laser welding of the disclosure includes: preparing a pair of workpieces being a pair of plate members respectively having through-holes common in size and shape, which are aligned when the workpieces are overlapped; overlapping and placing the pair of workpieces on a base jig having a pin hole aligned with the through-holes; preparing a main jig having an opening surrounding the through-holes along a laser welding position surrounding the through-holes outside the laser welding position; pressing the main jig against the base jig in a state in which the through-holes are surrounded by the opening; positioning the pair of workpieces with each other; allowing a displacement force in a direction toward the base jig to act on the main jig to clamp the pair of workpieces; preparing a sub-jig having a head and a pin and forming an annular light guiding path guiding a laser beam to the laser welding position located in a gap between the opening of the main jig and the head facing each other in a state in which the pin is inserted into the pin hole; inserting the pin into the pin hole through the through-holes of the pair of workpieces placed on the base jig; and allowing a displacement force in a direction to deepen the insertion of the pin to act on the sub-jig having the pin inserted into the pin hole through the through-holes of the pair of workpieces placed on the base jig until the head abuts against one of the workpieces to clamp the pair of workpieces.

A laser welding jig device of the disclosure includes a base jig which allows placement of a pair of workpieces comprising a pair of plate members overlapped with each other and respectively having through-holes common in size and shape, which are aligned when these plate members are overlapped with each other, and which has a pin hole aligned with the through-holes; a main jig which has an opening surrounding the through-holes along a laser welding position surrounding the through-holes outside the laser welding position and is pressed against the base jig in a state in which the through-holes are surrounded by the opening; a mechanism positioning the pair of workpieces with each other; a main clamper allowing a displacement force in a direction toward the base jig to act on the main jig to clamp the pair of workpieces; a sub-jig having a head and a pin and forming an annular light guiding path guiding a laser beam to the laser welding position located in a gap between the opening of the main jig and the head facing each other in a state in which the pin is inserted into the pin hole; and a sub-clamper allowing a displacement force in a direction to deepen the insertion of the pin inserted into the pin hole to act on the sub-jig to clamp the pair of workpieces.

Effect

According to the disclosure, a pair of workpieces are overlapped with each other and placed on a base jig, thereby making it possible to position these workpieces. Further, a light guiding path can be formed between an opening of a main jig and a head of a sub-jig. Thus, the periphery of a through-hole provided in the workpiece can be seamlessly laser-welded without requiring complicated work and with a small number of steps.

DETAILED DESCRIPTION

One embodiment will be described with reference to FIG. 1 to FIGS. 3A to 3D. The present embodiment is a method for laser welding and a laser welding jig device for, with a pair of separators 51 used for a fuel battery cell as workpieces, joining these separators 51.

Figure 1:
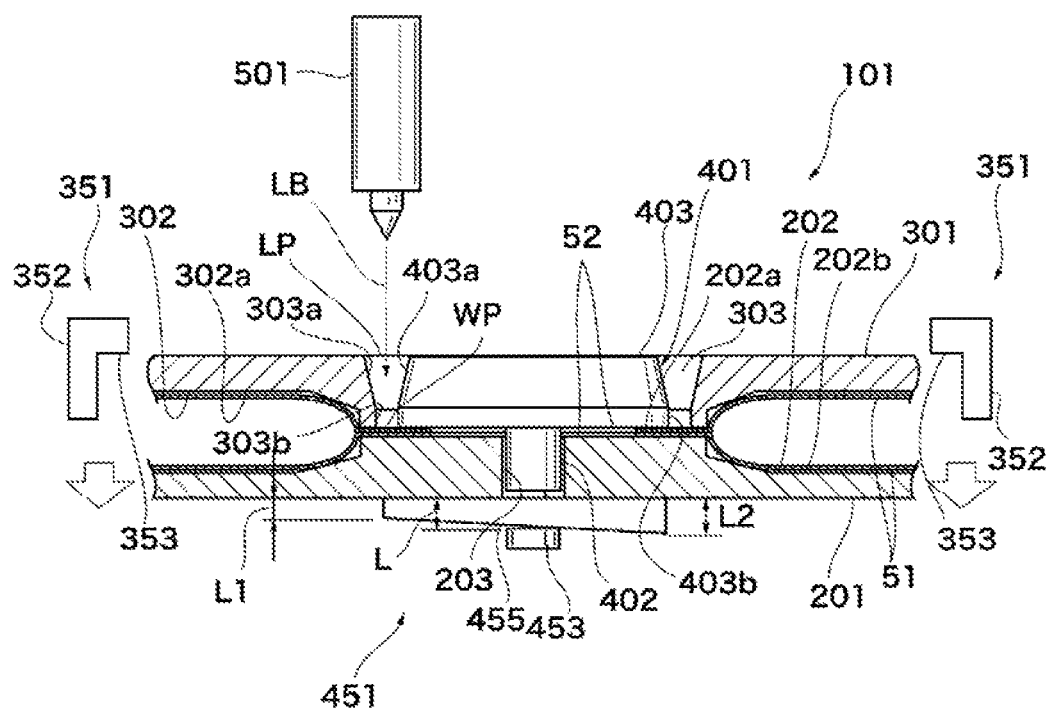
FIG. 1 is a schematic diagram showing a main part of a laser welding jig device according to an embodiment in cross section.
Figure 3A:
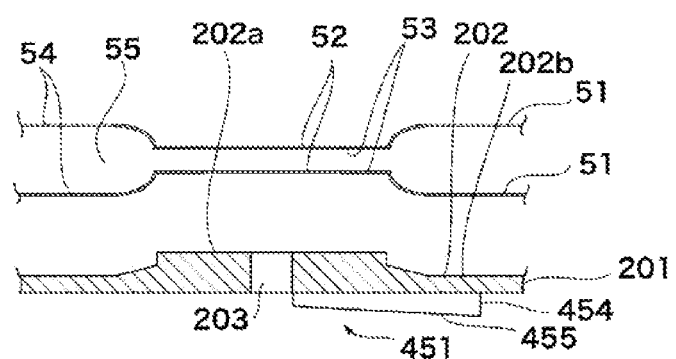
FIG. 3A is a schematic diagram showing a workpiece preparation step in a method for laser welding.

As shown in FIG. 1 and FIG. 3A, the laser welding jig device 101 irradiates the peripheries of through-holes 52 provided in the pair of separators 51 overlapped with each other with a laser beam LB by a laser irradiating device 501. At this time, since the laser welding jig device 101 is formed with an annular light guiding path LP for guiding the laser beam LB, a laser welding position WP as an irradiation region of the laser beam LB in the separator 51 positioned on the upper side is also annularly exposed. Thus, in terms of the pair of separators 51, the periphery of each of the through-holes 52 can be seamlessly laser-welded.

The pair of separators 51 is constituted by plate members each made of a metal as a material and has a symmetrical shape in which the upper and lower sides are inverted. The two separators 51 forming pairing of these have joining portions 53 and cavity forming portions 54. When the pair of separators 51 is overlapped and joined to each other, the joining portions 53 are portions to be joined to each other. The through-holes 52 are provided in the joining portions 53. The cavity forming portion 54 is a portion raised to be bent into a curved shape from the joining portion 53. When the pair of separators 51 is overlapped and joined, the mutual cavity forming portions 54 face each other to form a cavity 55 thereinside. The through-hole 52 and the cavity 55 are used as paths for circulating a medium in the fuel battery cell.

The through-holes 52 respectively provided in the pair of separators 51 coincide with each other in size and shape. When the pair of separators 51 is correctly overlapped, these through-holes 52 are also aligned. The shape of the through-hole 52 is, for example, a rectangle. The shape of the through-hole 52 is not limited to the rectangle, and can be formed into a variety of shapes such as a rectangular shape, a circular shape, and an oval shape in which four corners are curved in a curved form.

The laser welding jig device 101 includes a base jig 201, a main jig 301, a main clamper 351, a sub-jig 401, and a sub-clamper 451.

The base jig 201 is a metal plate and has a placing surface 202 on its upper surface, which allows placement of the overlapped separators 51. The placing surface 202 has, as a flat surface 202a, a surface for supporting the joining portion 53 of one separator 51 serving as a lower side, and has a position corresponding to the cavity forming portion 54 as a recessed portion 202b. The base jig 201 has a structure for, when the pair of separators 51 are overlapped with each other and placed on the placing surface 202, restricting and positioning the positions in the horizontal direction, of those separators 51. This structure constitutes a mechanism for mutually positioning the pair of separators 51.

The placing surface 202 of the base jig 201 is provided with a pin hole 203 with being positioned in the flat surface 202a. The pin hole 203 is a hole to be aligned with the through-hole 52 of each separator 51 placed on the placing surface 202. The pin hole 203 may be smaller than the through-hole 52, and can assume any shape. Various shapes such as a rectangle, a polygon, a circle, and an oval shape can be adopted in the pin hole 203.

The main jig 301 is a metal plate object pressed against the base jig 201 via the pair of separators 51 placed on the placing surface 202, and has a facing surface 302 at its lower surface. The facing surface 302 defines a position corresponding to the cavity forming portion 54 of one separator 51 serving as the upper side as a recessed portion 302a, and has a clamp surface 302b (refer to FIG. 3C) and an opening 303 at a position facing the flat surface 202a provided on the placing surface 202. The clamp surface 302b is disposed around the opening 303, and clamps the joining portions 53 of the pair of separators 51 placed on the placing surface 202 together with the flat surface 202a. The opening 303 is formed to be larger than the pin hole 203 provided in the base jig 201 and forms a light guiding path LP together with a head 403 of the sub-jig 401 to be described later. In terms of that relationship, the opening 303 is formed in such a shape as to surround the through-holes 52 along the laser welding position WP at the outside of the laser welding position WP. The light guiding path LP will be described later.

The main clamper 351 is a mechanism for clamping the main jig 301 to the base jig 201 and principally contains a clamper 352. The clamper 352 has a clamp claw 353 attached to the base jig 201 and extending in a horizontal direction which is hooked on the upper surface of the main jig 301 and allowed to exert a pulling force (indicated by void arrows in FIG. 1) directed downward. Thereby, the main jig 301 is clamped and hence the pair of separators 51 is held between the main jig 301 and the base jig 201. Therefore, the main clamper 351 clamps the pair of separators 51 between the base jig 201 and the main jig 301.

The sub-jig 401 is a metal member having the head 403 at one end of a columnar pin 402. Since the pin 402 is inserted into the pin hole 203 provided in the base jig 201, the pin 402 is formed to be slightly smaller than the pin hole 203. Thus, the pin 402 has a horizontal cross-sectional shape corresponding to the pin hole 203. The size of the horizontal cross-section thereof is smaller than that of each of the through-holes 52 provided in the pair of separators 51 in a manner similar to that of the pin hole 203. The head 403 is a member having a vertical cross section formed in a trapezoidal shape and is formed to be larger than the pin 402. However, as described above, in terms of a relation in which the head 403 forms the light guiding path LP together with the opening 303 provided in the main jig 301, the head 403 is formed in a similar shape smaller than that of the opening 303 along the laser welding position WP inside the laser welding position WP. The light guiding path LP will be described later.

The sub-clamper 451 is a mechanism for clamping the pair of separators 51 on the flat surface 202a of the base jig 201 by the head 403 of the sub-jig 401.

The pin 402 of the sub-jig 401 is inserted into the pin hole 203 through the through holes 52 of the separators 51 placed on the placing surface 202 of the base jig 201. At this time, the tip of the pin 402 completely penetrates the pin hole 203 and protrudes from the lower surface of the base jig 201. The tip of the pin 402 protruding in this way is provided with a small-diameter portion 452 in a region from a portion that completely penetrates the pin hole 203 to a portion that does not slightly penetrate the pin hole 203. The small-diameter portion 452 is formed in a cylindrical shape having a horizontal cross section smaller than that of the pin 402. However, the small-diameter portion 452 is not provided to the tip of the pin 402. The tip of the pin 402 serves as a coming-off prevention portion 453 which acts as a coming-off stop. The coming-off prevention action of the coming-off prevention portion 453 will be described later.

Figure 2:
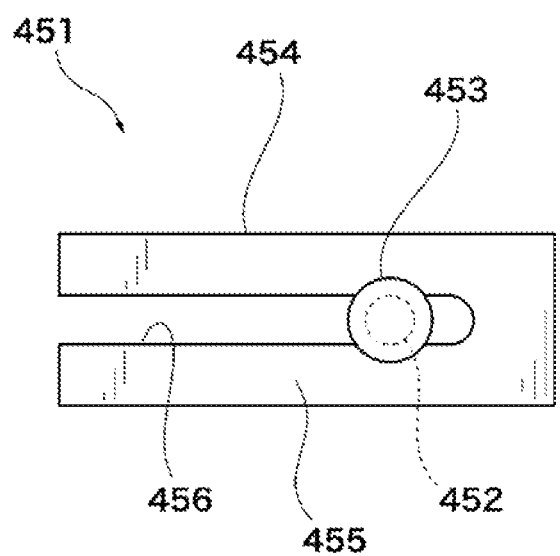
FIG. 2 is a bottom view of a sub-clamper.

As shown in FIGS. 1 and 2, a slider 454 is slidably attached to the lower surface of the base jig 201. The slider 454 is a tabular member having an inclined surface 455 at its lower surface, and has a fitting groove 456 along its longitudinal direction. The fitting groove 456 is opened at an end whose thickness is reduced by the inclined surface 455, extends toward an end having a thicker thickness and is set to a width narrower than that of the pin 402 of the sub-jig 401 and wider than that of the small-diameter portion 452 provided in the pin 402.

The slider 454 is varied in thickness depending on the location by defining its lower surface as the inclined surface 455. The thickness of such a slider 454 has a correlation with the pin 402 of the sub-jig 401 protruding through the pin hole 203 of the base jig 201. When the dimension of a distance from the lower surface of the base jig 201 to the coming-off prevention portion 453 of the pin 402 is assumed to be L, the thickness dimension L1 of the thinnest portion of the slider 454 is set smaller than L, and the thickness dimension L2 of the thickest portion thereof is set larger than L (refer to FIG. 1). Thus, the thickness dimension of the slider 454 becomes L at any position from the thinnest portion to the thickest portion.

The slider 454 sets as a standby position, a position where the inlet of the fitting groove 456 is faced with the pin 402 of the sub-jig 401 protruding through the pin hole 203 of the base jig 201 (refer to FIG. 3C), and determines a slide moving direction in a direction from the standby position to the pin 402. At this time, the fitting groove 456 proceeds without being brought into contact with the small-diameter portion 452 of the pin 402. Then, when the thickness dimension of the slider 454 becomes L at the position of the pin 402, the slider 454 is interposed between the lower surface of the base jig 201 and the coming-off prevention portion 453, so that the sub jig 401 is brought into a clamped state.

Figure 3B:
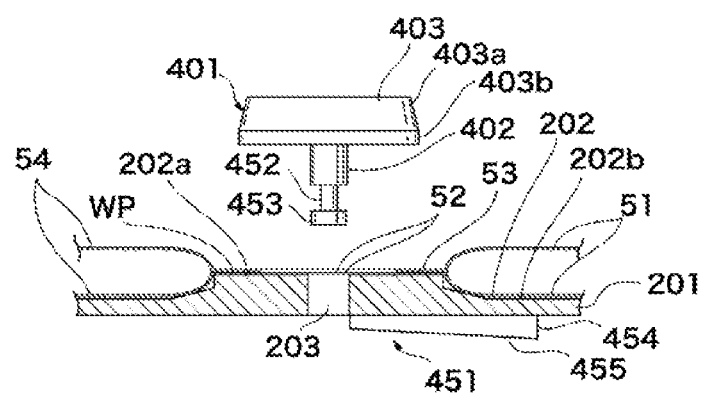
FIG. 3B is a schematic diagram showing a workpiece placing step.
Figure 3C:
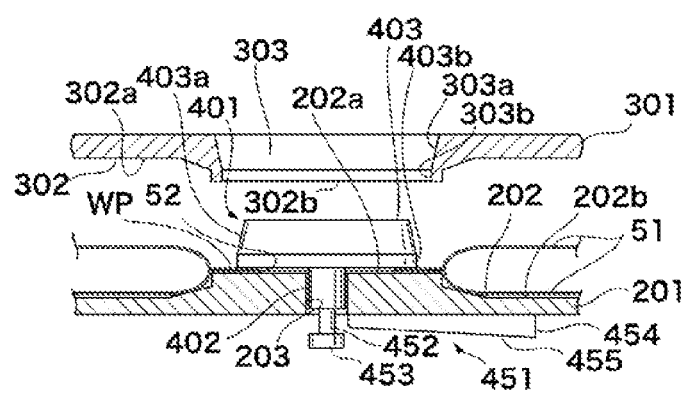
FIG. 3C is a schematic diagram showing a set step of a main jig and a sub-jig.
Figure 3D:
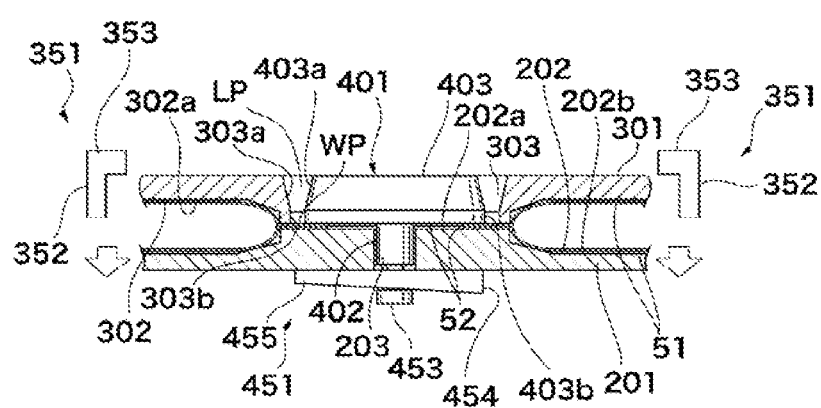
FIG. 3D is a schematic diagram showing a clamp step.

As shown in FIGS. 1 and 3D, the light guiding path LP for irradiating the laser beam LB from the laser irradiating device 501 is formed by a gap between the inner surface of the opening 303 provided in the main jig 301 and the outer surface of the head 403 of the sub-jig 401. The inner surface of the opening 303 becomes an inclined surface 303a narrowed as coming downward from upward. When the inner surface reaches a region near the lower surface of the main jig 301, it becomes a vertical surface 303b. Since the head 403 has a trapezoidal shape in its vertical cross section, the outer surface of the head 403 becomes an inclined surface 403a expanded as coming downward from upward, and becomes a vertical surface 403b when the outer surface reaches a region near its lower end. The inclined surface 303a of the opening 303 and the inclined surface 403a of the head 403 are faced with each other, and the vertical surface 303b of the opening 303 and the vertical surface 403b of the head 403 are faced with each other. These facing regions serve as the light guiding path LP. The light guiding path LP exposes the laser welding position WP at its bottom.

A method for laser welding using the laser welding jig device 101 will next be described. The method for laser welding of the present embodiment is executed by a workpiece preparation step, a workpiece placing step, a set step of a main jig and a sub-jig, a clamp step, and a laser beam irradiation step.

Workpiece Preparation Step

As shown in FIG. 3A, the pair of separators 51 is prepared and aligned in a direction in which the cavity 55 is formed between the mutual cavity forming portions 54.

Workpiece Placing Step

As shown in FIG. 3B, the pair of separators 51 is overlapped and placed on the placing surface 202 of the base jig 201. Then, the cavity forming portion 54 of the separator 51 positioned on the lower side is fitted into the recessed portion 202b of the base jig 201, so that each joining portion 53 is placed on the flat surface 202a.

Thus, a step of positioning the pair of separators 51 with each other is executed. That is, the pair of separators 51 is positionally regulated and positioned in the horizontal direction together, and their through-holes 52 are also aligned. The pair of through-holes 52 aligned in this manner is aligned even with the pin hole 203 of the base jig 201.

Set Step of Main Jig and Sub-Jig

As shown in FIG. 3C, the sub-jig 401 is prepared, and the pin 402 of the sub-jig 401 is inserted into the pin hole 203 through the through-holes 52 of the pair of separators 51 placed on the base jig 201. Further, the main jig 301 is prepared and placed on the base jig 201. At this time, since the base jig 201 and the main jig 301 are predetermined in position, the clamp surface 302b of the main jig 301 becomes a state of being pressed against the flat surface 202a of the base jig 201 in a state in which the through-holes 52 are enclosed with the opening 303.

Clamp Step

As shown in FIG. 3D, a clamp operation by the sub-jig 401 and a clamp operation by the main jig 301 are executed with respect to the pair of separators 51.

The clamp operation by the sub-jig 401 is performed by slidingly moving the slider 454. When the slider 454 is moved until the inclined surface 455 of the slider 454 abuts against the coming-off prevention portion 453 of the pin 402, the displacement force in the direction to deepen the insertion of the pin 402 acts on the sub-jig 401, so that the head 403 of the sub-jig 401 is pressed against the placing surface 202 through the pair of separators 51. Thus, the pair of separators 51 is clamped between the base jig 201 and the head 403.

The clamp operation by the main jig 301 is performed by pressing the main jig 301 against the base jig 201 via the pair of separators 51 so that the light guiding path LP is formed between the main jig 301 and the sub-jig 401. Thereby, the pair of separators 51 is clamped between the base jig 201 and the main jig 301.

Order of Set and Clamp of Main Jig and Sub-Jig

In the present embodiment, the main jig 301 is set after the sub-jig 401 is set, and the main jig 301 is clamped after the sub-jig 401 is clamped.

On the contrary, in implementing the embodiment, either of the main jig 301 and the sub-jig 401 may be set first regardless of the order thereof in terms of the set of the main jig 301 and the sub-jig 401. Further, even in terms of the clamp of the main jig 301 and the sub-jig 401, either of the main jig 301 and the sub-jig 401 may be clamped first regardless of the order thereof. In this case, the previously-set one corresponding to either of the main jig 301 and the sub-jig 401 is clamped, and then one set subsequently may be clamped. Alternatively, they may be clamped in order after setting both of them.

In the present embodiment, the order of the set and clamp between the main jig 301 and the sub-jig 401 is pretermitted because the base jig 201 is provided with the mechanism for positioning the pair of separators 51 with each other. In implementing the embodiment, the mechanism for positioning the pair of separators 51 with each other may be provided to be dispersed into the base jig 201 and the main jig 301. That is, the structure for positioning is dispersed in such a manner that the base jig 201 positionally regulates the separator 51 positioned on the lower side in the horizontal direction, and the main jig 301 positionally regulates the separator 51 positioned on the upper side in the horizontal direction.

When such a dispersion structure is adopted, it is necessary to provide such a structure that the main jig 301 is correctly positioned when placed on the base jig 201 or the main jig 301 is correctly positioned when clamped to the base jig 201. Though any structure is adopted, the pair of separators 51 is positioned with each other for the first time by correctly positioning the main jig 301 with respect to the base jig 201. Thus, in a stage before the main jig 301 is correctly positioned, the upper side separator 51 is not correctly positioned either, and hence in this stage, the sub-jig 401 cannot be set and clamped. The positioning of the main jig 301 is necessary prior to the clamping of the sub-jig 401.

Laser Beam Irradiation Step

As shown in FIG. 1, the laser welding position WP of one separator 51 (separator 51 positioned upward) is irradiated with the laser beam LB through the light guiding path LP, and the pair of separators 51 is fixed by laser welding. At this time, since the light guiding path LP is annularly formed in the clamp step described above, the periphery of the through-hole 52 can be laser-welded seamlessly. Thus, the method for laser welding using the laser welding jig device 101 is executed.

According to the present embodiment, the pair of separators 51 can be positioned to the base jig 201 only by placing the pair of separators 51 on the base jig 201. It is therefore possible to facilitate the positioning of each part. Further, the annular light guiding path LP can be naturally formed only by setting the main jig 301 and the sub-jig 401 and clamping the same to the base jig 201. Thus, according to the present embodiment, the periphery of the through-hole 52 provided in each separator 51 can be seamlessly laser-welded with a small number of steps and without requiring complicated work.

Figure 4:
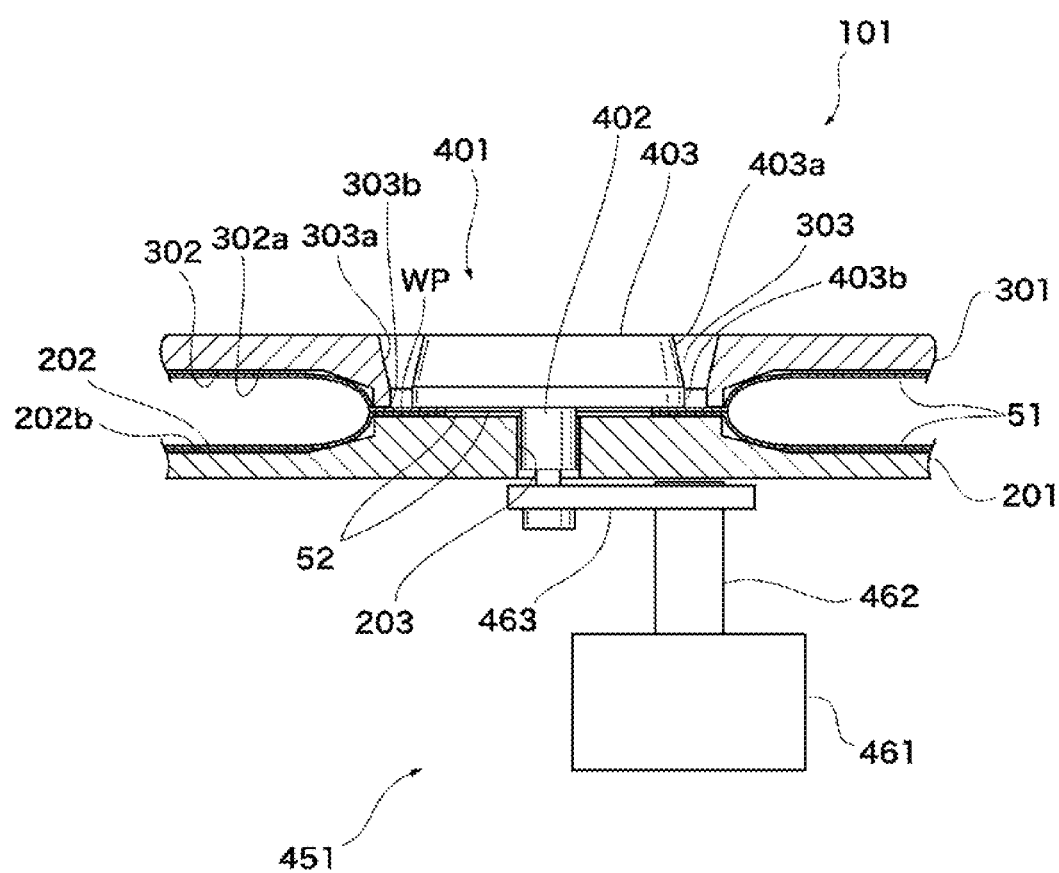
FIG. 4 is a schematic diagram showing another example of a sub-clamper.

Another example of the sub-clamper is shown in FIG. 4. Parts other than the sub-clamper are the same as those of the laser welding jig device 101 shown in FIG. 1. The present example is an example in which the pin 402 of the sub-jig 401 is pulled downward by using an air cylinder 461.

A rod 462 of the air cylinder 461 is connected to the pin 402 through a connecting jig 463. The connecting jig 463 has one end side connected to the small-diameter portion 452 of the pin 402 by a structure similar to that of the fitting groove 456 of the slider 454 shown in FIG. 2, and the other end side fixed to the rod 462 so as not to come off. The connecting jig 463 can be connected to the pin 402 penetrated through the pin hole 203 of the base jig 201 by disposing the air cylinder 461 reciprocatably in the same direction as the slider 454 of the embodiment shown in FIG. 1 and FIGS. 3A to D.

In the example of such a structure, the rod 462 moves back and forth in the vertical direction by driving of the air cylinder 461. Therefore, if the rod 462 is driven in the pulling-in direction, a displacement force in a direction to deepen the insertion of the pin 402, i.e., a pulling force directed downward can be made to act on the sub-jig 401. Thereby, the pair of separators 51 can be clamped between the base jig 201 and the head 403.

Figure 5:
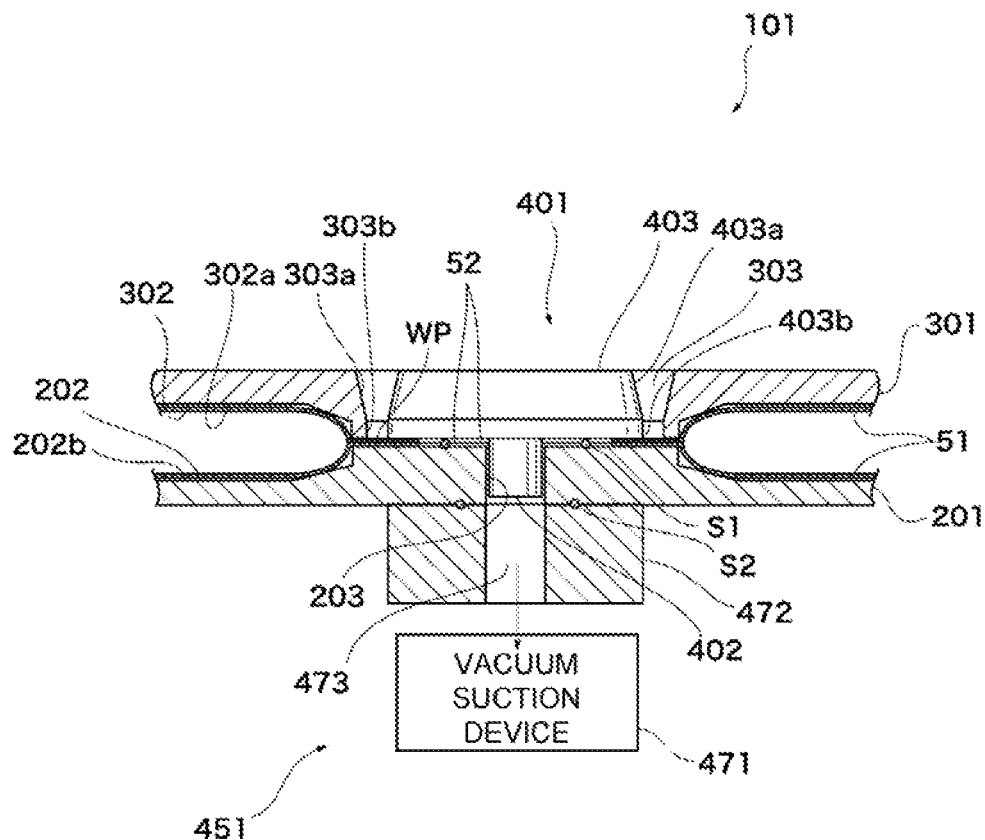
FIG. 5 is a schematic diagram showing a further example of a sub-clamper.

A further example of the sub-clamper is shown in FIG. 5. Parts other than the sub-clamper are the same as those of the laser welding jig device 101 shown in FIG. 1. The present example is an example in which the pin 402 of the sub-jig 401 is pulled downward by using a vacuum suction device 471.

In the present example, a suction block 472 is fixed to the lower surface of the base jig 201. The suction block 472 has a suction hole 473 at the center thereof. Thus, the suction block 472 is fixed by aligning the position of the suction hole 473 with the pin hole 203 of the base jig 201.

In order to maintain airtightness in the suction hole 473, seals S1 and S2 consisting of end face seals are provided at two positions in the present example. The seal S1 is provided on the upper surface of the base jig 201. The seal S1 surrounds the pin hole 203 and is completely covered with the lower surface of the head 403. The seal S2 is provided at a portion between the lower surface of the base jig 201 and the upper surface of the suction block 472. The seal S2 surrounds the pin hole 203.

Thus, in a state in which the pin 402 is inserted into the pin hole 203, the internal space of the pin hole 203 and the suction hole 473 can be demarcated from other space. Thus, by operating the vacuum suction device 471 disposed at the lower surface of the suction block 472, the internal space of the pin hole 203 and the suction hole 473 can be made negative in pressure.

In the example of such a structure, since the internal space of the pin hole 203 and the suction hole 473 becomes negative pressure by the operation of the vacuum suction device 471, a displacement force in a direction to deepen the insertion of the pin 402, i.e., a pulling force directed downward can be made to act on the sub-jig 401. Thereby, the pair of separators 51 can be clamped between the base jig 201 and the head 403.

Figure 6:
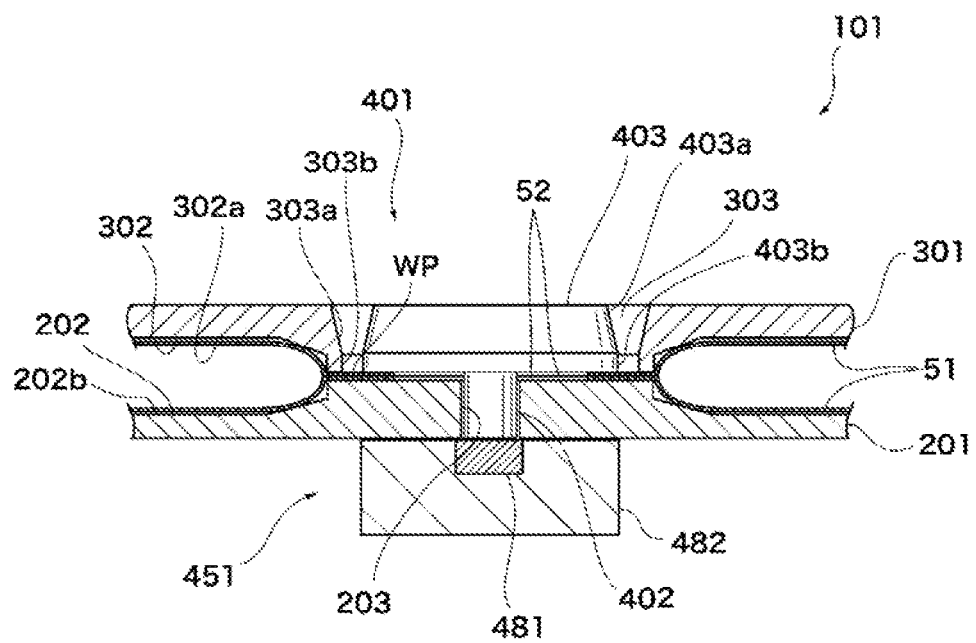
FIG. 6 is a schematic diagram showing yet another example of a sub-clamper.
Figure 7:
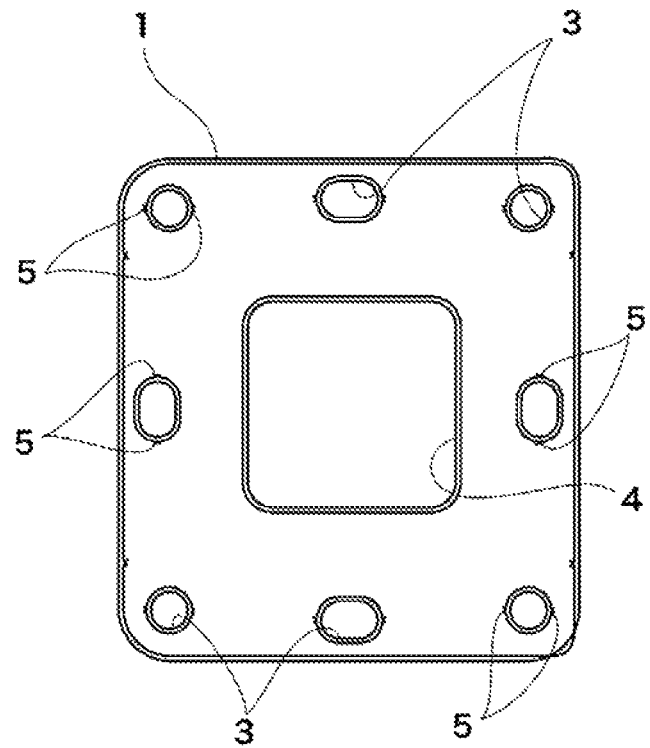
FIG. 7 is a plan view showing an example of a separator used for a fuel battery cell.
Figure 8:
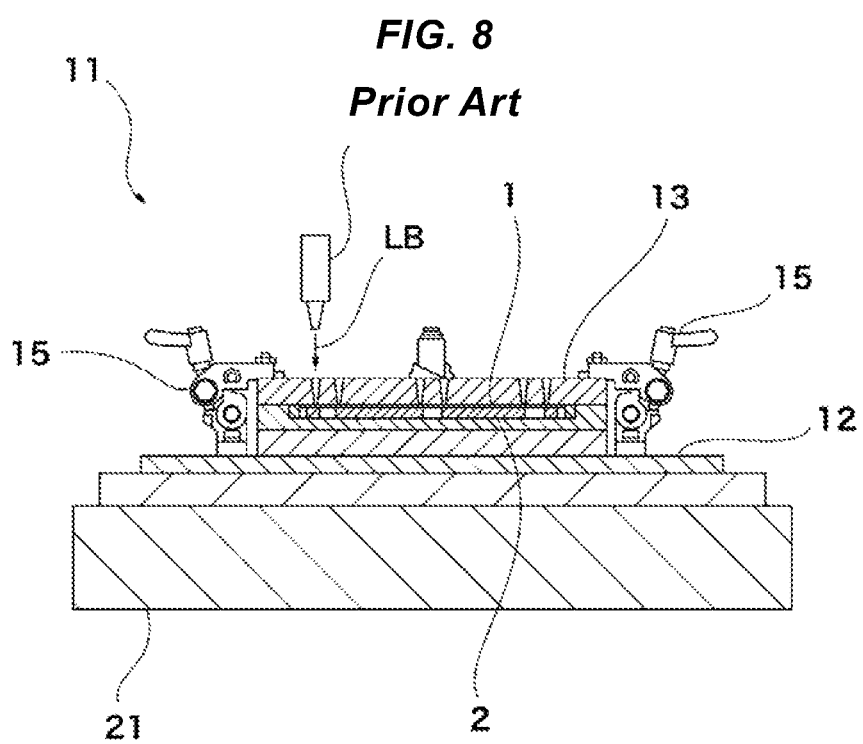
FIG. 8 is a front view showing a conventional example of a laser welding jig device.
Figure 9:
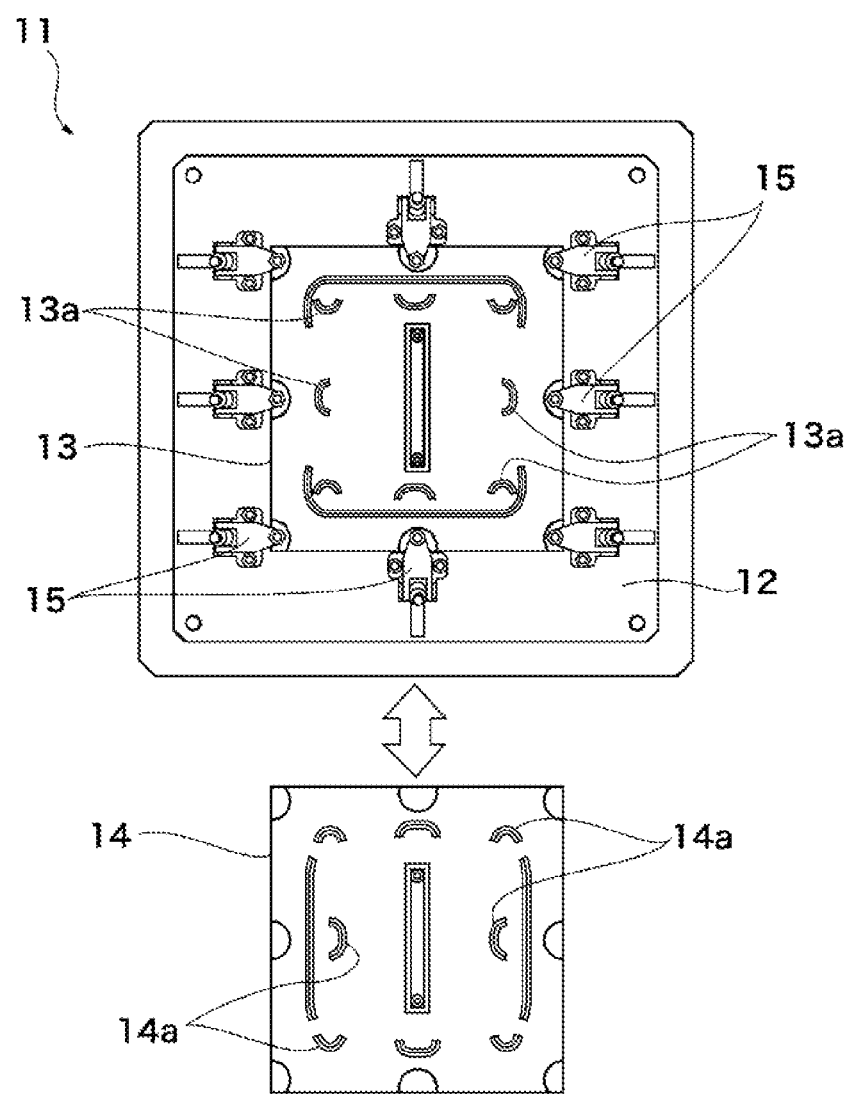
FIG. 9 is a schematic diagram for explaining a conventional welding step.
Figure 10:
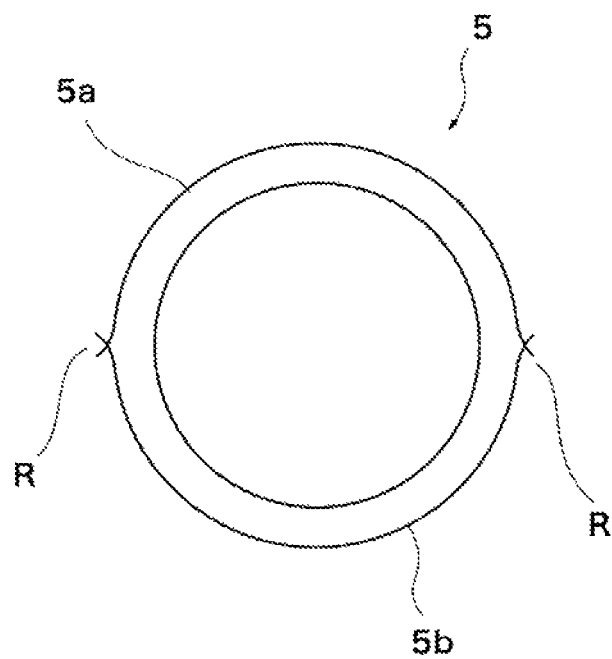
FIG. 10 is a schematic diagram showing a laser mark around a pin hole.

Yet another example of the sub-clamper is shown in FIG. 6. Parts other than the sub-clamper are the same as those of the laser welding jig device 101 shown in FIG. 1. The present example is an example in which the pin 402 of the sub-jig 401 is pulled downward by using a magnetic force of a magnet 481.

In the present example, an adsorption block 482 is fixed to the lower surface of the base jig 201. The adsorption block 482 is, for example, a block body having a cylindrical magnet 481 embedded and held therein. One surface of the magnet 481 is exposed on its upper surface. Thus, by allowing the bottom surface of the pin 402 inserted into the pin hole 203 to adsorb the magnet 481, the sub-jig 401 can be sucked in the direction of the magnet 481. In the present example, the dimensions of the respective parts are determined so that the base jig 201 exhibits a sufficient clamping force to the pair of separators 51 in a state in which the magnet 481 is adsorbed to the bottom surface of the pin 402.

In the example of such a structure, when the magnet 481 is adsorbed to the bottom surface of the pin 402 inserted into the pin hole 203, a displacement force in a direction to deepen the insertion of the pin 402, i.e., a pulling force directed downward can be made to act on the sub-jig 401. Thereby, the pair of separators 51 can be clamped between the base jig 201 and the head 403.

Various modifications and changes are permitted in implementing the embodiment.

For example, although the present embodiment has introduced the pair of separators 51 having a symmetrical shape in which the upper and lower sides are inverted, it is not always necessary to form the symmetrical shape in implementing the embodiment.

The structure in which the pin 402 of the sub-jig 401 is pulled from below the base jig 201 is exemplified in all the sub-clampers 451 of the above-described embodiment, but the disclosure is not limited to this in implementing the embodiment. Such a sub-clamper 451 as to press the head 403 from above the sub-jig 401 may be adopted.

Any other modifications and changes are permitted.

The invention claimed is:

1. A method for laser welding, the method comprising:
   preparing a pair of workpieces being a pair of plate members respectively having through-holes common in size and shape, which are aligned when the workpieces are overlapped;
   overlapping and placing the pair of workpieces on a base jig having a pin hole aligned with the through-holes;
   preparing a main jig having an opening surrounding the through-holes along a laser welding position surrounding the through-holes outside the laser welding position;
   pressing the main jig against the base jig in a state in which the through-holes are surrounded by the opening;
   positioning the pair of workpieces with each other;
   allowing a displacement force in a direction toward the base jig to act on the main jig to clamp the pair of workpieces;
   preparing a sub-jig having a head and a pin and forming an annular light guiding path guiding a laser beam to the laser welding position located in a gap between the opening of the main jig and the head facing each other in a state in which the pin is inserted into the pin hole;
   inserting the pin into the pin hole through the through-holes of the pair of workpieces placed on the base jig; and
   allowing a displacement force in a direction to deepen the insertion of the pin to act on the sub-jig having the pin inserted into the pin hole through the through-holes of the pair of workpieces placed on the base jig until the head abuts against one of the workpieces to clamp the pair of workpieces.

2. The method for laser welding according to claim 1, wherein the pair of workpieces is a pair of separators used for a fuel battery cell.

3. A laser welding jig device, comprising:
   a base jig which allows placement of a pair of workpieces comprising a pair of plate members overlapped with each other and respectively having through-holes common in size and shape, which are aligned when these plate members are overlapped with each other, and which has a pin hole aligned with the through-holes;

a main jig which has an opening surrounding the through-holes along a laser welding position surrounding the through-holes outside the laser welding position and is pressed against the base jig in a state in which the through-holes are surrounded by the opening;

a mechanism positioning the pair of workpieces with each other;

a main clamper allowing a displacement force in a direction toward the base jig to act on the main jig to clamp the pair of workpieces;

a sub-jig having a head and a pin and forming an annular light guiding path guiding a laser beam to the laser welding position located in a gap between the opening of the main jig and the head facing each other in a state in which the pin is inserted into the pin hole; and a sub-clamper allowing a displacement force in a direction to deepen the insertion of the pin inserted into the pin hole to act on the sub-jig to clamp the pair of workpieces.

4. The laser welding jig device according to claim 3, wherein the pair of workpieces is a pair of separators used for a fuel battery cell.

\* \* \* \* \*